United States Patent [19]
Novak

[11] 3,859,849
[45] Jan. 14, 1975

[54] VALVE STEM PRESSURE INDICATOR

[76] Inventor: Greg A. Novak, P.O. Box 511, Oakland, Calif. 94604

[22] Filed: Mar. 21, 1973

[21] Appl. No.: 343,343

Related U.S. Application Data

[62] Division of Ser. No. 135,330, April 19, 1971, Pat. No. 3,739,637.

[52] U.S. Cl.............. 73/146.8, 116/34 R, 137/229
[51] Int. Cl........................................... B60c 23/04
[58] Field of Search....... 73/146.3, 146.8; 116/34 R; 137/226, 227, 229, 231

[56] References Cited
UNITED STATES PATENTS

| | | | |
|---|---|---|---|
| 1,741,198 | 12/1929 | McKenna........................... | 137/226 |
| 1,769,508 | 7/1930 | Harned.............................. | 116/34 R |
| 2,037,968 | 4/1936 | Duty et al.......................... | 116/34 R |
| 3,289,480 | 12/1966 | Sams.............................. | 73/146.3 X |
| 3,450,147 | 6/1969 | Webb.................................. | 137/226 |

*Primary Examiner*—Richard C. Queisser
*Assistant Examiner*—Daniel M. Yasich
*Attorney, Agent, or Firm*—Bruce & McCoy

[57] ABSTRACT

A pneumatic tire pressure gauge or filler device having an adjustable biasing means for setting the air pressure which is contained in a tire. The device includes a whistle aperture whereby when the pressure contained in the tire is above the adjusted pressure, the excess pressure will escape through the aperture and emit a whistling sound.

4 Claims, 10 Drawing Figures

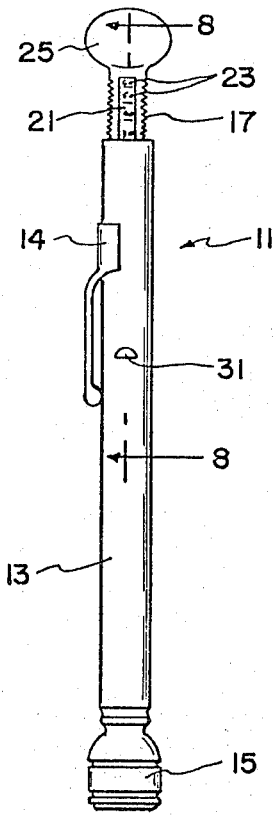
Fig-1
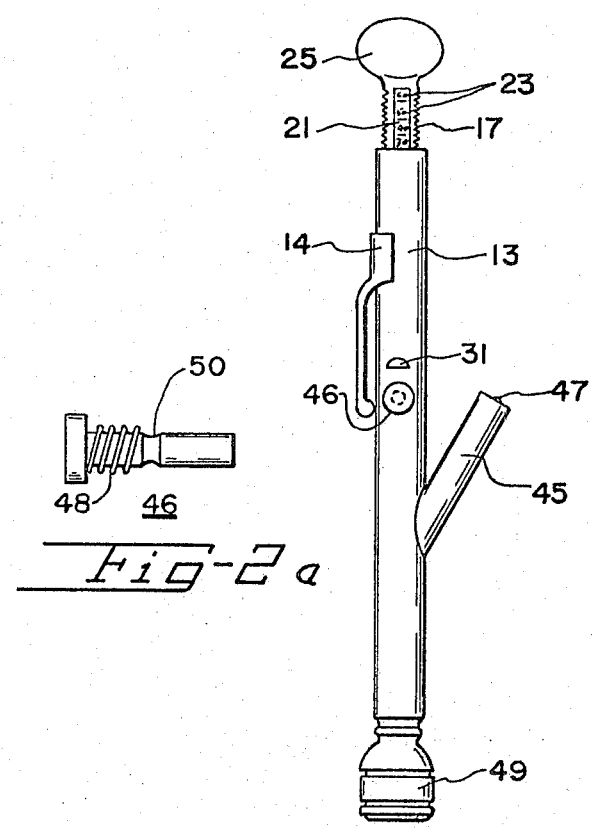
Fig-2a
Fig-2
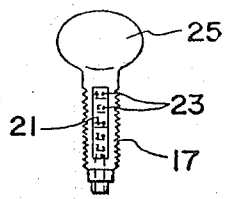
Fig-3
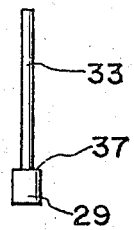
Fig-4
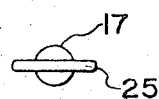
Fig-5

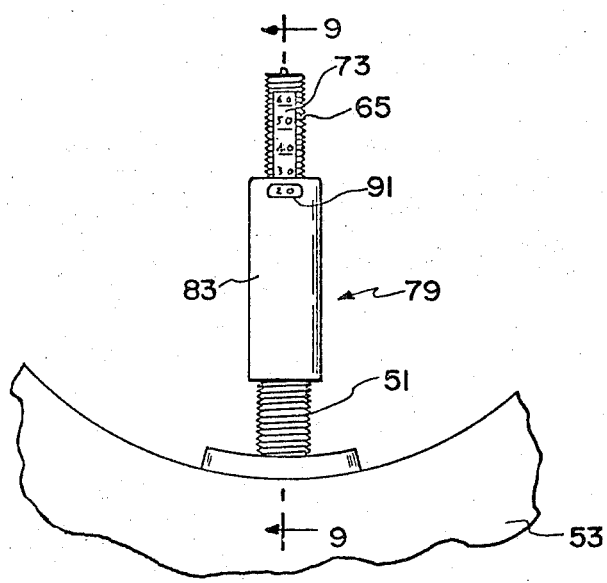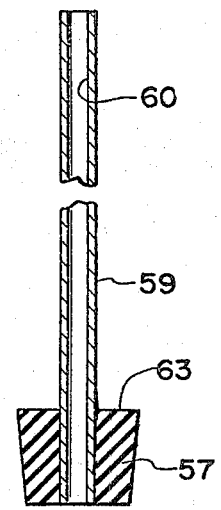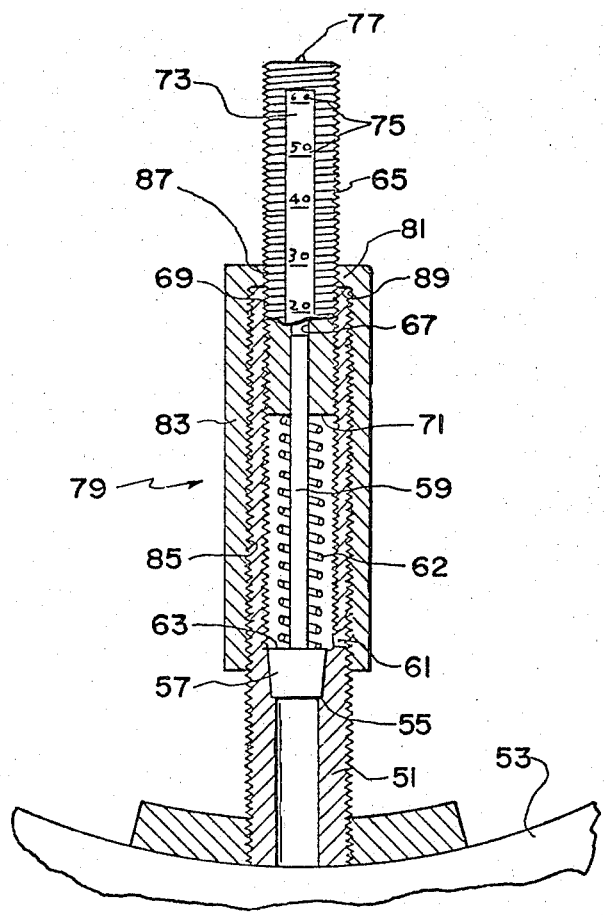

VALVE STEM PRESSURE INDICATOR

CROSS REFERENCE TO RELATED APPLICATIONS

This is a division of application Ser. No. 135,330 filed Apr. 19, 1971 which application issued on June 19, 1973 as U.S. Pat. No. 3,739,637.

BACKGROUND OF THE INVENTION

1. Field of the Invention

The invention relates generally to air pressure gauges and more particularly to air pressure fillers or gauges which emit a whistling sound when a pressure over an adjustable, predetermined pressure is sensed thereby.

2. Description of the Prior Art

Pocket type tire pressure gauges are well known. These gauges usually have a body with a movable flat stem marked with various pressures inserted therein. When the inlet of the gauge is inserted over the stem of a tire, the air pressure of the tire is indicated by the outward movement of the flat stem.

Standard service station hoses, commonly found in gasoline and diesel fuel automotive fuel stations, include pressure gauges similar to the above-mentioned pocket type tire gauge, in that the stem thereof is forced outwardly and indicates the air pressure contained in the tire by numbered marks placed on the outwardly forced stem.

The presently available devices, however, merely indicate the air pressure contained in the tire or article to be filled, but do not give warning of overpressure, nor are they capable of relieving the pressure therein to thereby adjust the pressure contained in an article to an adjustable, predetermined pressure. The present invention overcomes the above disadvantages by providing a pneumatic pressure indicator, which is both adjustable, to thereby regulate the pressure contained in the article, and to emit a signal or whistle whereby a person is warned of any overpressure in the article being filled or measured.

SUMMARY OF THE INVENTION

The pneumatic pressure indicator of the invention comprises a hollow body with an inlet opening and a valve slidably mounted within the body. The valve is adjustably biased against a stop wherein it normally covers a whistle aperture formed in the body. If, upon application of pressure to the inlet passage, the pressure is over an adjusted, predetermined value, the valve will be moved against the action of the biasing means to allow excess pressure to exit through the aperture with a whistling sound.

OBJECTS OF THE INVENTION

It is therefore an object of the present invention to provide a pneumatic pressure indicator with a signaling means to indicate when a preset pressure is reached.

Another object of the invention is the provision of an adjustable biasing means whereby the advent of the indicating signal may be adjusted to a predetermined pressure.

A further object of the instant invention is the provision of a pressure indicator which may be used to measure the pressure in a tire or the like and which indicates an adjustable, predetermined pressure in the tire by emitting a signal.

A further object of the invention is the provision of a pressure indicator which may be used to fill a tire or the like and which emits a signal when an adjustable, predetermined pressure is reached within the article being filled.

And it is still another object of the present invention to provide a tire with a valve stem which is adjustable to control the pressure contained in the tire and which emits a signal when the pressure in the tire is above the adjusted level.

DESCRIPTION OF THE DRAWINGS

FIG. 1 is a side elevation of a preferred embodiment of an adjustable, pocket-type pressure gauge in accordance with the present invention;

FIG. 2 is a side elevation of a second embodiment of the present invention, showing an adjustable pocket-type combination tire-filler and pressure gauge;

FIG. 2A is a side elevation showing the air inlet pin and compression spring of FIG. 2;

FIG. 3 is a side elevation of the adjustable thumbscrew insertable into the end of the pressure gauge of the present invention for adjustably controlling the pressure measured thereby;

FIG. 4 is a side elevation of the piston valve and stem for controlling escape of air from the pressure gauge of the present invention;

FIG. 5 is a top plan view of the thumbscrew of FIG. 4;

FIG. 6 is a side elevation of a third embodiment of the present invention, showing an adjustable pressure indicator for mounting on the valve stem of a tire;

FIG. 7 is a side elevation of a modified piston valve for use with the pressure indicator of FIG. 6;

FIG. 8 is a partial cross-sectional view taken along line 8—8 of FIG. 1; and

FIG. 9 is a partial cross-sectional view taken along line 9—9 of FIG. 6.

DESCRIPTION OF THE PREFERRED EMBODIMENTS

In accordance with the present invention, a tire pressure measuring gauge or a tire filling attachment is provided with an adjustable biasing means controlling the operation of a valve for measuring and controlling the pressure contained in a tire. The invention further provides for a signaling means which indicates that the pressure in the tire is above the adjusted value, or which signals the user that the adjusted value has been reached.

Referring now to FIGS. 1, 3–5 and 8 of the drawings, there is shown a preferred embodiment of applicant's invention, comprising a pocket-type pneumatic tire air pressure gauge 11, having an elongated body 13 with an air pressure inlet head 15 at one end thereof. A pocket clip 14 is attached to the body and instead of the normal flat or rectangular stem inserted within a passage contained in the body, applicant's present invention comprises a threaded shaft 17 insertable into a thread 19 formed in an interior passage 20 of the body (see FIG. 8). The threaded shaft is preferably provided with at least one flat portion or side 21 having numerals 23 placed thereon, such as by embossing or stamping. The numerals are so calibrated and spaced apart, that when aligned with the end of the gauge body, or some other indicating means, the indicated numeral will represent the desired pressure in a tire or the like, as explained more fully hereinafter.

The threaded shaft 17 is preferably provided with an integral turning means, such as a thumbscrew 25, whereby it may be easily turned with respect to the gauge body.

As shown more clearly in FIG. 8, the interior passage 20 is provided with a valve seat 27 having a valve 29 coacting therewith. Closely adjacent to and slightly above the valve seat, an aperture 31 is formed. As shown, the aperture is in the shape of a half-moon and is preferably of such dimensions that a whistling signal or sound will be emitted by air under pressure passing therethrough. The valve 29 is preferably of the piston type which completely blocks the passage of air through the valve seat and aperture in the closed position. the piston valve includes an elongated stem member 33 extending along the centerline of the gauge with a spring 35 surrounding the stem and resting against the top face 37 of the piston.

The threaded shaft 17 having the thumbscrew 25 formed integrally therewith is provided with a central blindhole or passage 39 and includes an unthreaded bottom portion 41. A further reduced unthreaded portion is preferably fixed to the unthreaded bottom portion 41 whereby the spring 35 may slide over this portion into contact with a face 43. When the shaft 17 is threaded into the passage, the piston stem 33 extends into the blind-hole 39 and the face 43 acts against the free end of the spring. Therefore, when the threads of the shaft contact the interior threads 19 of the passage and the shaft is rotated therein, the piston stem 33 slides within the blind-hole 39, and the face 43 of the shaft acts to compress the spring to more positively bias or press the piston valve 29 into contact with the valve seat 27.

It is, of course, understood that the compression of the spring 35, and the marking of the numerals 23 on the flat surface of the shank, must be so calibrated and coordinated that when a numeral, such as 25, is aligned with the indicating means of the gauge body, the user of the gauge will therefore know that the spring is compressed to a 25 pound per square inch value whereby, as a minimum, a corresponding 25 psi pressure must be applied to the valve to lift the piston and thereby expose partially or wholly the whistle opening in the gauge body. When the piston valve is raised, any air escaping through the whistle aperture will emit a whistling sound readily discernible to the ears of a user and immediately give warning of the existence of a pressure over the adjusted value. Therefore, with the proper calibration and coordination of the spring with the numerals marked on the threaded shaft, the initial or first movement of the valve away from its seat and the whistling sound caused by the air escaping through this initial opening, will indicate that the exact same pressure has been reached in the tire.

FIG. 2 discloses a further embodiment of the present invention, wherein the gauge body 13 is modified by providing it with an air inlet passage 45 formed integrally therewith. An air hose engaging pin 47 is preferably provided within the passage 45. The air inlet is adapted so that a rubber hose, of the type commonly found in service stations may be quickly attached thereto.

However, if this embodiment is to serve as a permanent filling station tire-inflating device, the air-inlet passage 45 may be fashioned at its end in the form of a quick-disconnect male air connection for permanent attachment to the standard gas station air-filling hose female connection. In this application, the air hose engaging pin 47 is omitted, and an air-inlet pin 46 is provided. Pin 46 is inserted in a bore (not shown) formed in body 13 and is normally biased outwardly by a compression spring 48 to thereby block the flow of air through passage 20. Pin 46 includes an air-escape groove 50 formed therein whereby, upon depression of the pin against the action of spring 48, the groove 50 will be aligned with passage 20 to permit air to flow therethrough.

When the tire is to be inflated, the thumb-screw 25, preferably provided with a quick-acting thread, is turned to the required tire-pressure numbered setting, and the tire is inflated to the point at which a whistling sound is commenced. At this point, the inlet head of the inflating device is removed from the tire-valve stem. In this usage, the pocket clip 14 may be omitted.

Here, the end or outlet coupling 49 is so constructed that it engages the usual spring-loaded air-inlet valve (not shown) of a tire valve-stem to which it is connected.

Therefore, if the thumbscrew adjusting mechanism is again pre-set to the 25 pound level, when the pressure of the air within the tire, and therefore within the lower passage, is 25 pounds or above, the piston valve will be forced upwardly, against the biasing force of the spring, and the air escaping through the aperture will emit a whistling sound, thereby indicating to the user that the adjusted pressure has been applied to or reached in the tire.

FIGS. 6, 7 and 9 disclose a third embodiment of the present invention wherein the valve stem 51 of a tire 53 is provided with adjustable gauge and whistling aperture. The standard stem, now presently used in all existing tires and tubes, may be used by merely removing the springloaded air inlet valve therefrom, and forming a valve seat 55 within the central passage. A piston valve 57 having a stem 59 fixed thereto and provided with a passage 60 extending centrally thereof through the piston valve is inserted into the valve stem into contact with the valve seat. A whistle aperture 61, similar to the whistle aperture 31 seen in the embodiment shown in FIG. 8, is formed in the valve stem slightly above the valve seat. A compression spring 62 is slid over the piston stem into contact with the upper face 63 of the piston valve and a hollow threaded shaft 65, having a passage 67 extending centrally thereof, is threaded into fairly tight fitting internal threads 69 formed within the valve stem. The central passage 67 of the threaded shaft is of such a diameter that a portion of the hollow piston stem 59 is insertable therein whereby the threaded shaft may be threaded downwardly within the stem to enable its end 71 to compress the spring and whereby, upon upward movement of the piston valve against the force of the spring, the piston stem may slide freely therein.

In the preferred embodiment shown, the threaded shaft 65 is provided with turning flats 73 on opposite sides thereof. Properly calibrated and coordinated numerals 75 are formed on each of the flats. The upper end of the internal passage 67 of the hollow shaft is provided with an internal seat (not shown) having a spring bias air inlet valve 77 coacting therewith, whereby, when a pressurized air hose is inserted over the end of the threaded shaft, air will force the valve 77 downward and allow pressurized air to pass through the central passage 67 in the shaft, to the passageway 60 formed through the piston stem and valve and into the tire or tube to be filled.

The threaded shaft 65 is adjustable by applying a wrench or the like to the two flat sides 73 thereof and turning the shaft until the numerals formed thereon are aligned with an indicating means, such as the upper end of the valve stem. To prevent accidental movement of the shaft when the tire is turning or is brushed against some object, a locking member 79 which preferably also acts as a means for closing off the whistle aperture 61 is provided. The locking member comprises an upper locking portion 81 and a hollow, extending skirt portion 83. The skirt 83 is provided with threads 85 formed internally thereof, whereby it may be threaded with a fairly lose fit over the tire stem. A threaded bore 87 is formed in the upper locking portion 81 to allow the bore to be threadedly mounted over the threaded shaft 65. When the locking portion 81 in its operative position with the bottom portion 89 thereof in contact with the top of the tire stem, the threaded shaft will be prevented from moving.

To enable a person to see at what value the compression of the spring 62 acting against the valve has been set, number-viewing windows 91, spaced 180° apart, are provided in the skirt portion 83. These viewing windows are aligned with the numerals on both flats of the threaded shaft when the lock nut is in the operative position, whereby the value of adjusted pressure is easily discernible. Moreover, the skirt portion 83 is of such a length that in the locked position of the member 79, the whistle aperture is closed. This will insure protection of the whistle aperture and prevent dirt and other foreign matter from entering therein.

In this last embodiment of the invention, the valve stem provided on the tire enables an initial setting of the pressure to be applied to the tire to be made, and no further setting thereof is required. Therefore, with the threaded shaft in the properly set position, such as 25 psi, and an air hose is inserted over the free end of the threaded shaft to apply air thereto, air will continue to flow into the tire until the pressure reaches the adjusted value. Any over-pressure will cause the piston valve to be moved upwardly against the biasing force of the spring to allow the air to escape through the uncovered aperture causing a whistling sound to be emitted. If the locking member member 79 is applied to the stem valve, the member is merely loosened to uncover the whistle aperture.

Therefore, an important advantage of the present invention is the signal whistling capabilities of the pressure indicator which signals the user thereof that the pressure in the tire or the like is above the adjusted value.

Furthermore, with the unique combination of safety and signaling features of this invention, a predetermined, adjustable pressure may be both measured and regulated in a tire or the like.

What is claimed is:

1. A pneumatic pressure indicator comprising
    a hollow valve stem having a passageway extending axially therethrough attached to a tire or the like,
    a hollow, threaded shaft threadably mounted in one end of the passageway of said valve stem and having an axial passageway generally coaxial to said valve stem passageway, said threaded shaft being provided with turning flats on opposite sides thereof and a calibrated series of pressure indicating numbers formed along said flats which are alignable with an indicating means according to the pressure desired,
    a valve seat formed in said passageway through said stem near the connection of said stem to said tire,
    a piston valve reciprocally positioned in said stem passageway and capable of seating against said valve seat, and an elongated hollow stem fixed to said piston valve to provide a passage therethrough and extending outwardly into said passageway formed in said threaded shaft whereby air can be passed into the tire through said piston valve, such as by placing a pressurized air hose over a spring biased air inlet valve mounted in the upper end of said shaft passageway,
    at least one spring mounted over said stem and held between the lower end of said threaded shaft and said valve portion, the compression of said spring being adjustable for biasing said piston valve against said valve seat by the rotation of said shaft within said passageway of said stem, and
    a whistle aperture formed in the side of said valve stem above said valve seat whereby air is released through said aperture producing an audible sound when said piston valve is moved upward against the biasing of said spring at a preselected pressure level in a tire or the like.

2. The pneumatic pressure indicator of claim 1 further comprising a locking member having an upper locking portion with a threaded bore formed therein for threadably engaging said threaded shaft and a skirt portion internally threaded for threadedly engaging said valve stem whereby, when said locking member is threaded into engagement with said stem and shaft, said stem and shaft are locked together such that they cannot change their relative position in an unintended manner.

3. The pneumatic pressure indicator of claim 2 wherein said indicating means is comprised of a view port formed in the upper portion of said locking means such that said threaded shaft is turned until the number indicating the desired pressure appears in said viewing port.

4. The pneumatic pressure indicator of claim 3 wherein said skirt of said locking member when in locking position extends down over said threaded shaft to cover said whistle aperture whereby dirt and other foreign matter are prevented from clogging said aperture and whereby air will not escape during a transient over-pressure condition.

* * * * *